(12) United States Patent
Yasui et al.

(10) Patent No.: US 10,449,748 B2
(45) Date of Patent: Oct. 22, 2019

(54) DECORATIVE BOARD

(71) Applicant: AICA KOGYO CO., LTD., Aichi (JP)

(72) Inventors: Masataka Yasui, Aichi (JP); Kazuki Kouyama, Aichi (JP); Tomoya Ogino, Aichi (JP)

(73) Assignee: AICA KOGYO CO., LTD., Aichi (JP)

( * ) Notice: Subject to any disclaimer, the term of this patent is extended or adjusted under 35 U.S.C. 154(b) by 808 days.

(21) Appl. No.: 14/351,366

(22) PCT Filed: Oct. 12, 2012

(86) PCT No.: PCT/JP2012/076477
§ 371 (c)(1),
(2) Date: Apr. 11, 2014

(87) PCT Pub. No.: WO2013/054897
PCT Pub. Date: Apr. 18, 2013

(65) Prior Publication Data
US 2014/0242871 A1 Aug. 28, 2014

(30) Foreign Application Priority Data

Oct. 13, 2011 (JP) .................................. 2011-225419

(51) Int. Cl.
*B32B 29/02* (2006.01)
*B32B 5/02* (2006.01)
(Continued)

(52) U.S. Cl.
CPC .............. *B32B 5/022* (2013.01); *A47B 96/18* (2013.01); *B32B 5/26* (2013.01); *B32B 5/28* (2013.01);
(Continued)

(58) Field of Classification Search
CPC .......... A47L 396/18; B32B 5/26; B32B 5/28; B32B 17/04; B32B 29/02; B32B 29/06;
(Continued)

(56) References Cited

U.S. PATENT DOCUMENTS 4,514,462 A * 4/1985 Brooker .................. B32B 27/04
442/252
4,828,910 A * 5/1989 Haussling ............... B29C 70/08
442/391

(Continued)

FOREIGN PATENT DOCUMENTS

CN 101175634 A 5/2008
CN 101668632 A 3/2010
(Continued)

OTHER PUBLICATIONS

Koleske, Joseph, V. Ed., "Paint and Coating Testing Manual: Fourteenth Edition of the Gardner-Sward Handbook," 1995, American Society for Testing and Materials, Philadelphia, PA, p. 41.*
(Continued)

*Primary Examiner* — Andrew T Piziali
(74) *Attorney, Agent, or Firm* — Mai-Tram D. Lauer; Westman, Champlin & Koehler, P.A.

(57) ABSTRACT

A decorative board 5 includes: a prepreg 2 that includes a binder component including: at least one thermoplastic resin selected from a group consisting of acrylic resin having a glass-transition temperature Tg exceeding 0° C., vinyl chloride resin having a glass-transition temperature Tg exceeding 0° C., acrylic urethane, and aqueous polyurethane resin, and a thermosetting resin, a mixing ratio of the at least one thermoplastic resin to the thermosetting resin being 1:0-0.5 in solid content ratio, and an endothermic metal hydroxide; and a thermosetting resin impregnated decorative paper 1,
(Continued)

wherein the prepreg and the thermosetting resin impregnated decorative paper are stacked and integrated.

19 Claims, 1 Drawing Sheet

(51) Int. Cl.
*A47B 96/18* (2006.01)
*B32B 5/28* (2006.01)
*B32B 5/26* (2006.01)
*B32B 17/04* (2006.01)
*B32B 29/06* (2006.01)
*C08J 5/24* (2006.01)
*B44C 5/04* (2006.01)
*E04F 13/18* (2006.01)
*A47B 13/08* (2006.01)

(52) U.S. Cl.
CPC .............. *B32B 17/04* (2013.01); *B32B 29/02* (2013.01); *B32B 29/06* (2013.01); *B44C 5/0423* (2013.01); *C08J 5/24* (2013.01); *A47B 13/086* (2013.01); *B32B 2250/03* (2013.01); *B32B 2250/04* (2013.01); *B32B 2250/40* (2013.01); *B32B 2260/023* (2013.01); *B32B 2260/028* (2013.01); *B32B 2260/046* (2013.01); *B32B 2262/101* (2013.01); *B32B 2264/102* (2013.01); *B32B 2264/104* (2013.01); *B32B 2264/12* (2013.01); *B32B 2307/3065* (2013.01); *B32B 2307/718* (2013.01); *B32B 2451/00* (2013.01); *B32B 2479/00* (2013.01); *C08J 2333/08* (2013.01); *C08J 2333/12* (2013.01); *C08J 2361/28* (2013.01); *C08J 2461/28* (2013.01); *E04F 13/18* (2013.01); *E04F 2290/045* (2013.01); *Y10T 442/693* (2015.04)

(58) Field of Classification Search
CPC .............. B32B 5/022; B32B 2262/101; B32B 2451/00; B32B 2479/00; A47B 96/18; A47B 13/086; C08J 5/24; C08J 2333/08; C08J 2333/12; B44C 5/0423; Y10T 442/693; Y10T 442/3943; C04B 41/4535; C08F 2/22; C08F 2/24; C08F 299/0414; C08L 2201/52; C10L 2250/084; C10L 2250/086; D06N 2205/023
USPC .................................. 422/412; 442/412, 297
See application file for complete search history.

(56) References Cited

U.S. PATENT DOCUMENTS

| 8,071,224 | B2 | 12/2011 | Iwasaki et al. | |
|---|---|---|---|---|
| 2003/0091758 | A1* | 5/2003 | Osumi | B32L 317/06 428/34 |
| 2006/0234026 | A1 | 10/2006 | Huusken | |
| 2007/0048504 | A1* | 3/2007 | DiMario | C08G 18/12 428/195.1 |
| 2007/0193683 | A1* | 8/2007 | Huusken | B32B 27/04 156/307.3 |
| 2010/0136351 | A1 | 6/2010 | Iwasaki et al. | |
| 2011/0020572 | A1* | 1/2011 | Malek | B32B 27/08 428/35.7 |
| 2011/0263762 | A1* | 10/2011 | Matsuno | C08L 67/04 524/95 |

FOREIGN PATENT DOCUMENTS

| EP | 2156950 | A1 | * | 2/2010 | ............. B32B 5/26 |
|---|---|---|---|---|---|
| EP | 2156950 | A1 | * | 2/2010 | ............. B32B 5/26 |
| EP | 2156950 | A1 | | 2/2010 | |
| JP | H03253342 | A | | 11/1991 | |
| JP | 2002-166516 | A | | 6/2002 | |
| JP | 2005103769 | A | | 4/2005 | |
| JP | 200519953 | A | * | 7/2005 | ............. B32B 27/04 |
| JP | 2005199532 | A | | 7/2005 | |
| JP | 2006095743 | A | | 4/2006 | |
| JP | 2007245548 | A | | 9/2007 | |
| JP | 2008-173773 | A | | 7/2008 | |
| JP | 2008173773 | A | | 7/2008 | |
| JP | 2008290444 | A | | 12/2008 | |
| JP | 2008303378 | A | * | 12/2008 | ............. C09J 199/00 |
| KR | 10-2010-0017308 | A | | 2/2010 | |

OTHER PUBLICATIONS

Poly(vinyl chloride), PolymerProcessing.com.*
National Center for Biotechnology Information. PubChem Compound Database; CID=17317, https://pubchem.ncbi.nlm.nih.gov/compound/17317 (accessed Nov. 15, 2017) (PubChem, p. 6). (Year: 2017).*
Machine translation of JP 2005199532 (Year: 2005).*
Machine translation of JP 2008303378 A (Year: 2008).*
Gotou et al., Derwent Abstract Acc No. 1985-306749 (Gotou) (Year: 1985).*
Chinese Office Action dated Feb. 15, 2015, issued in corresponding Chinese Patent Application No. 201280049874.5 (16 pages).
International Preliminary Report on Patentability and Written Opinion dated Jan. 15, 2013 for corresponding International Patent Application No. PCT/JP2012/076477, filed Oct. 12, 2012.
International Search Report dated Jan. 15, 2013 for corresponding International Patent Application No. PCT/JP2012/076477, filed Oct. 12, 2012.
Extended European Search Report dated May 15, 2015, 7 pages.
Database WPI Week 200859 (XP-002738931) dated Jul. 31, 2008, 3 pages.
Australian Patent Examination Report No. 1, issued in Australian Patent Application No. 2012321703, dated Sep. 18, 2015 (3 pages).
EPO Communication dated Jun. 2, 2017 for European Application No. 12840405.0-1377.
Indian Examination Report dated Dec. 28, 2017 for Indian Patent Application No. 1002/KOLNP/2014.
Korean Office Action dated Jul. 12, 2018 in the corresponding Korean patent application No. 10-2014-7008567 and its English translation.
Indonesian office action dated Dec. 17, 2018 in the corresponding Indonesian patent application No. P-00201402812 and explanation of the relevant part of Office Action in English.

* cited by examiner

DECORATIVE BOARD

CROSS-REFERENCE TO RELATED APPLICATIONS

This Application is a Section 371 National Stage Application of International Application No. PCT/JP2012/076477, filed Oct. 12, 2012 and published as WO 2013/054897 A1 on Apr. 18, 2013, in Japanese, and claims the benefit of Japanese Patent Application No. 2011-225419 filed Oct. 13, 2011 in the Japan Patent Office, the contents of which are hereby incorporated by reference in their entirety.

TECHNICAL FIELD

This invention relates to a decorative board.

BACKGROUND ART

Conventionally known are thermosetting resin decorative boards. Among the thermosetting resin decorative boards, particularly melamine decorative boards that comply with "Testing Method for Laminated Thermosetting High-pressure Decorative Sheet" of JIS K 6902 are excellent in heat resistance, impact resistance, abrasion resistance, and dimensional stability, and thus have been used widely for house appliances, interior materials (such as top plates and counters), and others.

Recently, there has become known a non-combustible decorative board that is manufactured using, as a fibrous substrate constituting a core layer, an inorganic fiber non-woven fabric instead of kraft paper and also using a slurry obtained by mixing a binder component constituted by a thermosetting resin and an inorganic filler (Patent Document 1). Also, there has been disclosed a technique of manufacturing a non-combustible decorative board using a prepreg impregnated with a slurry containing a thermosetting resin and a thermoplastic resin, such as synthetic resin emulsion or rubber latex (Patent Documents 2, 3 and 4).

PRIOR ART DOCUMENTS

Patent Document

Patent Document 1: Japanese Unexamined Patent Application Publication No. 2008-290444
Patent Document 2: Japanese Unexamined Patent Application Publication No. 2005-103769
Patent Document 3: Japanese Unexamined Patent Application Publication No. 2005-199532
Patent Document 4: Japanese Unexamined Patent Application Publication No. H3-253342

SUMMARY OF THE INVENTION

Problems to be Solved by the Invention

A conventional non-combustible decorative board has a larger board thickness of approximately 3 mm, and provides a recognizable butt end surface when adhered to a top plate of a desk or table, which results in a lack of structural integrity. Also, since a conventional non-combustible decorative board is thick and heavy, operation in a manufacturing process of furniture is more difficult as compared with a case of a usual melamine decorative board having a board thickness of 0.8 to 1.6 mm. It is one aspect of the present invention to solve the aforementioned problems.

Means to Solve the Problems

A decorative board according to the present invention includes: a prepreg that includes (a) a binder component including: (a1) at least one thermoplastic resin selected from a group consisting of acrylic resin having a glass-transition temperature Tg exceeding 0° C., vinyl chloride resin having a glass-transition temperature Tg exceeding 0° C., acrylic urethane, and aqueous polyurethane resin, and (a2) a thermosetting resin, a mixing ratio of the (a1) at least one thermoplastic resin to the (a2) thermosetting resin being 1:0-0.5 In solid content ratio, and (b) an endothermic metal hydroxide; and a thermosetting resin impregnated decorative paper, wherein the prepreg and the thermosetting resin impregnated decorative paper are stacked and integrated.

The decorative board according to the present invention has non-combustibility even in a case with a small board thickness (for example, even 0.6-0.8 mm). Moreover, the decorative board according to the present invention is easy to process, has small warpage, and is easy to handle.

EXPLANATION OF REFERENCE NUMERALS

Figure 1:
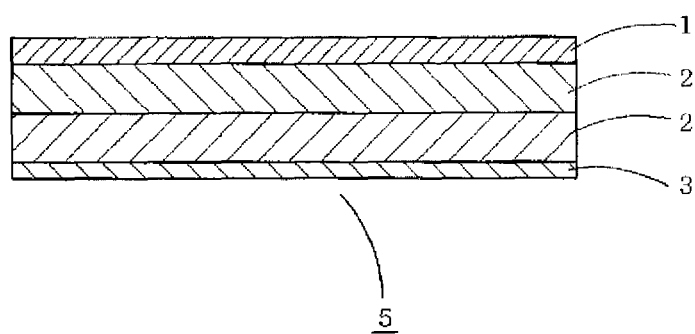
FIG. 1 is a cross sectional view showing a configuration of a non-combustible decorative board 5.

1 . . . melamine resin impregnated decorative paper
2 . . . prepreg
3 . . . melamine resin-impregnated balance paper
5, 5' . . . non-combustible decorative board

MODE FOR CARRYING OUT THE INVENTION

In the present invention, a mixing ratio of (a1) a thermoplastic resin to (a2) a thermosetting resin is 1:0-0.5 in solid content ratio (in weight ratio). Due to the mixing ratio within such range, improved elasticity of a decorative board can be achieved.

The (a1) thermoplastic resin is at least one selected from a group consisting of acrylic resin having a glass-transition temperature Tg exceeding 0° C., vinyl chloride resin having a glass-transition temperature Tg exceeding 0° C., acrylic urethane, and aqueous polyurethane resin. Among these, when using acrylic resin having a glass-transition temperature exceeding 0° C., further improved bendability, adhesion, and formability can be achieved. There is no particular limitation on glass-transition temperatures Tg of acrylic urethane and aqueous polyurethane resin.

Also, in a case of using an acrylic resin emulsion having an average particle diameter of 150-300 nm as the (a1) thermoplastic resin, it is possible to achieve further improvements in. binding capacity of the prepreg, and bending workability and smoothness of the decorative board. It can be assumed that the reason for improvement in smoothness is that acrylic resin emulsion is in a state of fine particles. The average particle diameter is a value calculated based on scattered lights detected when a laser light is irradiated by means of a laser diffraction and scattering type particle diameter measuring apparatus (ELS-8000 manufactured by Otsuka Electronics Co., Ltd.).

Examples of the (a2) thermosetting resin may include melamine-formaldehyde resin, phenol-formaldehyde resin, and unsaturated polyester resin. The (a2) thermosetting resin, which is an optional constituent, need not be mixed.

Since (b) an endothermic metal hydroxide, which contains crystal water, is decomposed, absorbs heat, and releases bound water at high temperatures, non-combustibility of the decorative board of the present invention can be improved. Examples of the endothermic metal hydroxide may include aluminum hydroxide, magnesium hydroxide, calcium hydroxide.

The (b) endothermic metal hydroxide may be a mixed constituent of a slurry along with, for example, (a) a binder component, and the like. The slurry may be impregnated into, for example, a fibrous substrate, to thereby manufacture a prepreg. The endothermic metal hydroxide may have an average particle diameter within a range of, for example, 1-50 μm. The average particle diameter is an arithmetic average diameter calculated based on a particle distribution (a volume distribution) detected by means of the laser diffraction and scattering method (the microtrack method). The average particle diameter of the endothermic metal hydroxide within the aforementioned range leads to an improved dispersibility of the (b) endothermic metal hydroxide in the slurry, and an improved impregnating ability of the slurry into the fibrous substrate. Also, the average particle diameter of the endothermic metal hydroxide within the aforementioned range leads to a smooth surface finish of the decorative board.

The aforementioned prepreg may include, for example, a non-aqueous inorganic filler in addition to the (b) endothermic metal hydroxide. Examples of the non-aqueous inorganic filler may include carbonates, such as calcium carbonate, magnesium carbonate and zinc carbonate, silica, talc, and fly ash. The non-aqueous inorganic filler may have an average particle diameter (an arithmetic average diameter calculated based on a particle size distribution (a volume distribution) detected by means of the laser diffraction and scattering method (the microtrack method)) within a range of, for example, 0.05-20 μm. In this case, a further improved impregnating ability of the slurry into the fibrous substrate may be achieved.

From among non-aqueous inorganic fillers, carbonates (for example, calcium carbonate) may be particularly selected. In this case, further improvements in workability and machinability in the manufacturing process of the decorative board may be achieved. As the calcium carbonate, heavy calcium carbonate, light calcium carbonate (precipitated calcium carbonate), or the like may be employed. The calcium carbonate may have an average particle diameter of, for example, 0.05-10 μm, more preferably 1-5 μm. To have an average particle diameter of 0.05 pm or more suppresses aggregation of calcium carbonate in the slurry, resulting in an improved impregnating ability of the slurry into the fibrous substrate. Also, to have an average particle diameter of 10 μm or less results in a further smooth surface and thus an improved appearance of the decorative board.

Here, light calcium carbonate means calcium carbonate chemically produced by calcination of limestone; heavy calcium carbonate means fine-powdered calcium carbonate produced by dry or wet pulverization of white crystalline limestone.

A mixing ratio of the (b) endothermic metal hydroxide to an entire inorganic filler included in the prepreg may be, for example, 50-100 weight %. In this case, a further improved combustibility of the decorative board may be achieved.

In the decorative board of the present invention, the prepreg may include, for example, (c) a silane coupling agent. In this case, as compared with a case of not including the (c) silane coupling agent, a further smaller weight increase rate is attained in terms of boiling resistance according to the "Testing Method for Laminated Thermosetting High-pressure Decorative Sheet" of JIS K-6902, and adhesion between the prepreg and the thermosetting resin impregnated decorative paper is further improved.

A mixing ratio of the component (c) may be, for example, 0.7-0.9 weight % of the entire components (a)+(b)+(c). In this case, in terms of boiling resistance according to the "Testing Method for Laminated Thermosetting High-pressure Decorative Sheet" of JIS K-6902, the weight increase rate becomes further smaller and adhesion between the prepreg and the thermosetting resin impregnated decorative paper is further improved.

Examples of the silane coupling agent may include (meth) acryloyloxy group-containing silane such as 3-(meth) acryloyloxypropyl trimethoxysilane, 3-(meth) acryloyloxypropyltriethoxysilane; vinyl group-containing silane such as vinyl trimethoxysilane, vinyl triethoxysilane; epoxy group-containing silane such 3-glycidoxypropyltrimethoxysilane, 3-glycidoxypropyltriethoxysilane; styryl group-containing silanes such as p-styryl trimethoxysilane; amino group-containing silane such as 3-aminopropyltrimethoxysilane, 3-aminopropyltriethoxysilane; and mercapto group-containing silane such as 3-mercaptopropyl trimethoxysilane. Particularly when employing epoxy group-containing silane or amino group-containing silane, a further increased bridge density in the prepreg is obtained.

A ratio of (a) the binder component in the entire components (a)+(b)+(c) may be, for example, 9-15 weight % in solid content. Having a ratio of 15 weight % or less leads to a further improved non-combustibility and to suppression of oozing of synthetic resin during thermocompression molding. Having a ratio of 9 weight % or more leads to an increased adhesion in the prepreg, and further facilitates control of an impregnation amount of the slurry into the fibrous substrate.

The prepreg in the decorative board of the present invention may be manufactured by, for example, impregnating the slurry containing the (a) binder component and the (b) endothermic metal hydroxide into the fibrous substrate. Examples of the fibrous substrate may include organic fiber substrates and inorganic fiber substrates.

Examples of the organic fiber substrates may include fibers made of polyethylene, polypropylene, vinylon, polyvinyl chloride, polyvinylidene chloride, polyacrylonitrile, polyamide, polyester, polyurethane, conversion products of the aforementioned, and various copolymers as represented by ethylene-vinyl acetate copolymer, as well as conjugated fibers made of mixtures of the aforementioned and the above described copolymers.

Examples of the inorganic fiber substrates may include non-woven fabric and woven fabric made of glass fiber, rock wool, carbon fiber, and the like. A basis weight of the inorganic fiber substrate may be within a range of, for example, 10-200 g/m$^2$. In cases of using inorganic fiber substrates, a further improved non-combustibility is achieved compared with cases of using organic fiber substrates. In cases of using non-woven glass fiber fabrics among inorganic fiber substrates, heat resistance, flame resistance, and impregnating ability of the slurry is further improved.

An impregnation rate (%) of slurry solid content into the fibrous substrate is preferably within a range of 700-1200% according to a calculation method represented by Mathematical Formula 1. The rate of 1200% or below leads to reduction of dropping of the slurry solid content from the prepreg, thereby facilitating easy handling of the prepreg. The rate of 700% or more suppresses delamination of the prepreg.

$$\text{Impregnation rate (\%)} = \frac{\text{Weight after impregnation} - \text{Weight before impregnation}}{\text{Weight before impregnation}} \times 100 \quad \text{[Mathematical Formula 1]}$$

In the decorative board of the present invention, a decorative layer may be formed on, for example, at least one surface of a core layer constituted by a prepreg in which a fibrous substrate is impregnated with slurry. Examples of methods for forming the decorative layer may include a method of applying a coating, a method of using a resin impregnated decorative paper, and a method of transferring a decorative layer using a transfer foil. In a case of using a resin impregnated decorative paper, improvements are achieved in productivity of the decorative board, adhesion between the core layer and the decorative layer, and abrasion resistance of the decorative layer.

The method of using a resin impregnated decorative paper is, for example, a method in which a resin solution composed mainly of thermosetting resin is first impregnated into a base paper for thermosetting resin decorative board, and subsequently a dried resin impregnated decorative paper is stacked and thermocompression molding is performed. For thermocompression molding, a press machine, such as a flat press machine and a continuous press machine, may be employed.

A resin impregnated decorative paper may be manufactured by, for example, impregnating a resin solution containing thermosetting resin, such as amino-formaldehyde resin, diallyl phthalate resin, and unsaturated polyester resin, into a decorative paper of 30-140 g/m² for thermosetting resin decorative board such that the impregnation rate represented by Mathematical Formula 1 is within 80-300%. Among resin impregnated decorative papers, amino-formaldehyde resin impregnated decorative paper is further excellent in heat resistance and abrasion resistance.

The decorative board of the present invention may have a decorative layer provided on one surface or each of both surfaces of the decorative board. In a case where a decorative layer (for example, a decorative layer constituted by a resin impregnated decorative paper) is provided only on one surface, it may be possible to dispose, for example, balance paper on the other surface. With the balance paper disposed, warpage or breakage of the decorative board can be further suppressed.

Examples of the balance paper may include resin impregnated balance paper obtained by impregnating a resin solution composed mainly of a thermosetting resin (such as melamine resin, urea resin, guanamine resin, diallyl phthalate resin, acrylic resin) and having an adjusted viscosity by dilution with water or organic solvent into surface paper for decorative board having a basis weight of 18-40 g/m² at the rate of 260-320% according to the calculation method represented by Mathematical Formula 1, and then drying the impregnated surface paper.

EXAMPLE 1

(1) Manufacturing of Slurry

A slurry containing the below-mentioned components was manufactured:

Acrylic resin emulsion having a glass-transition temperature Tg of 47° C. and formed by polymerizing ethyl acrylate and methyl methacrylate as main monomers (Product No. AXN-150, manufactured by AICA Kogyo Co., Ltd., average particle diameter: 225 nm): 36 parts by weight (solid content).

Aluminum hydroxide (endothermic metal hydroxide) having an average particle diameter of 8 μm: 200 parts by weight Heavy calcium carbonate (non-aqueous inorganic filler) having an average particle diameter of 1 μm: 40 parts by weight The aforementioned acrylic resin emulsion is one example of the component (a1).

(2) Manufacturing of Prepreg

A non-woven glass fiber fabric (the fibrous substrate) of 50 g/m² was impregnated with the slurry manufactured in above (1) so as to have an impregnation rate of 800% according to the calculation method defined by Mathematical Formula 1, and was then dried to obtain a prepreg.

(3) Manufacturing of Melamine Resin Impregnated Decorative Paper Sheet

A white decorative paper for thermosetting resin decorative board having a basis weight of 100 g/m² was impregnated with a resin solution composed mainly of melamine formaldehyde resin so as to have an impregnation rate of 130% according to the calculation method defined by Mathematical Formula 1, and was then dried to obtain a melamine resin impregnated decorative paper.

(4) Manufacturing of Melamine Resin Impregnated Balance Paper

Surface paper for a thermosetting resin decorative board having a basis weight of 23 g/m² was impregnated with a resin solution composed mainly of melamine formaldehyde resin so as to have an impregnation rate of 280% according to the calculation method defined by Mathematical Formula 1, and was then dried to obtain melamine resin impregnated balance paper.

(5) Manufacturing of Non-Combustible Decorative Board

A sheet of the melamine resin impregnated balance paper manufactured in the above (4), two sheets of the prepreg manufactured in the above (2), and a sheet of the melamine resin impregnated decorative paper manufactured in the above (3) were stacked in this order from the bottom, and were integrated by thermocompression molding under conditions of 130° C., 70 kg/cm², and 60 minutes using a flat-finish plate to obtain a non-combustible decorative board. As shown in FIG. 1, the manufactured non-combustible decorative board 5 has a laminated structure of a sheet of the melamine resin impregnated decorative paper 1, two sheets of the prepreg 2, and a sheet of the melamine resin impregnated balance paper 3.

Table 1 to Table 3 show compositions of non-combustible decorative boards manufactured in the present example, and later-described respective examples and respective comparative examples. The unit for the compositions is part by weight.

TABLE 1

| | | | Example | | | | | | |
|---|---|---|---|---|---|---|---|---|---|
| | | | 1 | 2 | 3 | 4 | 5 | 6 | 7 |
| Binder (a) | (a1) | acrylic emulsion | 36 | 30 | 36 | 26 | 32 | 26 | 34 |
| | | acrylic urethane emulsion | — | — | — | — | — | — | — |
| | | urethane resin | — | — | — | — | — | — | — |
| | | vinyl chloride resin | — | — | — | — | — | — | — |
| | (a2) | phenol resin | — | — | — | — | — | — | — |
| | | melamine resin | — | — | — | — | — | — | — |
| Inorganic filler | | aluminum hydroxide (b) | 200 | 200 | 200 | 200 | 200 | 200 | 120 |
| | | calcium carbonate | 40 | 40 | 40 | 40 | 40 | 40 | 120 |
| Silane coupling | | epoxysilane | — | — | 2.4 | 2.2 | 2.2 | 1.9 | 2.2 |
| agent (c) | | aminosilane | — | — | — | — | — | — | — |
| | | Component a/Total components * 100 | 13.0 | 11.1 | 12.9 | 9.7 | 11.7 | 9.7 | 12.3 |
| Test item | | Thickness (mm) | 0.7 | 0.7 | 0.7 | 0.7 | 0.7 | 0.7 | 0.7 |
| | | Non-combustibility | ○ | ○ | ○ | ○ | ○ | ○ | ○ |
| | | Flexural strength (Mpa) | 109 | 102 | 107 | 100 | 104 | 98 | 109 |
| | | Elastic modulus (Gpa) | 9.1 | 8.6 | 8.9 | 8.3 | 8.9 | 8.2 | 9.2 |
| | | Dimentional change rate (%) | 0.36 | 0.36 | 0.36 | 0.32 | 0.33 | 0.33 | 0.36 |
| | | Warpage of decorative board (mm) | 11 | 11 | 11 | 8 | 9 | 9 | 11 |
| | | Bendability | 45R | 45R | 45R | 45R | 45R | 45R | 45R |
| | | Weight increase rate (%) | 8.5 | 9.1 | 5.8 | 4.3 | 5.2 | 5.2 | 5.1 |

TABLE 2

| | | | Example | | | | | | |
|---|---|---|---|---|---|---|---|---|---|
| | | | 8 | 9 | 10 | 11 | 12 | 13 | 14 |
| Binder (a) | (a1) | acrylic emulsion | 34 | 36 | 36 | — | — | — | 24 |
| | | acrylic urethane emulsion | — | — | — | 36 | — | — | — |
| | | urethane resin | — | — | — | — | 36 | — | — |
| | | vinyl chloride resin | — | — | — | — | — | 36 | — |
| | (a2) | phenol resin | — | — | — | — | — | — | — |
| | | melamine resin | — | — | — | — | — | — | 12 |
| Inorganic filler | | aluminum hydroxide (b) | 240 | 200 | 200 | 200 | 200 | 200 | 200 |
| | | calcium carbonate | 0 | 40 | 40 | 40 | 40 | 40 | 40 |
| Silane coupling | | epoxysilane | 2.2 | 2.2 | — | 2.2 | 2.2 | 2.2 | 2.2 |
| agent (c) | | aminosilane | — | — | 2.2 | — | — | — | — |
| | | Component a/Total components * 100 | 12.3 | 12.9 | 12.9 | 12.9 | 12.9 | 12.9 | 12.9 |
| Test item | | Thickness (mm) | 0.7 | 0.67 | 0.69 | 0.71 | 0.70 | 0.71 | 0.70 |
| | | Non-combustibility | ○ | ○ | ○ | ○ | ○ | ○ | ○ |
| | | Flexural strength (Mpa) | 107 | 90 | 108 | 98 | 101 | 105 | 102 |
| | | Elastic modulus (Gpa) | 9.1 | 8.3 | 9.1 | 7.9 | 8.1 | 8.5 | 10.5 |
| | | Dimentional change rate (%) | 0.36 | 0.33 | 0.32 | 0.33 | 0.39 | 0.38 | 0.39 |
| | | Warpage of decorative board (mm) | 10 | 20 | 7 | 7 | 13 | 11 | 23 |
| | | Bendability | 45R | 45R | 45R | 45R | 45R | 45R | 45R |
| | | Weight increase rate (%) | 5.5 | 5.2 | 3.6 | 4.5 | 6.9 | 5.4 | 4.3 |

TABLE 3

| | | | Comparative Example | | | | | | | |
|---|---|---|---|---|---|---|---|---|---|---|
| | | | 1 | 2 | 3 | 4 | 5 | 6 | 7 | 8 |
| Binder (a) | (a1) | acrylic emulsion | — | — | 18 | 12 | 18 | — | 36 | — |
| | | acrylic urethane emulsion | — | — | — | — | — | — | — | — |
| | | urethane resin | — | — | — | — | — | — | — | — |
| | | vinyl chloride resin | — | — | — | — | — | — | — | — |
| | (a2) | phenol resin | 36 | — | — | — | 18 | 11.5 | — | — |
| | | melamine resin | — | 36 | 18 | 24 | — | 9.5 | — | — |
| Inorganic filler | | aluminum hydroxide (b) | 200 | 200 | 200 | 200 | 200 | 200 | 200 | — |
| | | calcium carbonate | 40 | 40 | 40 | 40 | 40 | 40 | 40 | — |
| Slane coupling | | epoxysilane | 2.2 | 2.2 | 2.2 | 21 | 2.2 | — | 2.2 | — |
| agent (c) | | aminosilane | — | — | — | — | — | — | — | — |
| | | Component a/Total components * 100 | 12.9 | 12.9 | 12.9 | 12.9 | 12.9 | 8.0 | 11.7 | — |
| Test item | | Thickness (mm) | 0.7 | 0.7 | 0.7 | 0.7 | — | 0.69 | 0.7 | 1.2 |
| | | Non-combustibility | ○ | ○ | ○ | ○ | — | ○ | ○ | X |
| | | Flexural strength (Mpa) | 114 | 116 | 105 | 110 | — | 95 | 89 | — |
| | | Elastic modulus (Gpa) | 10.7 | 12.3 | 10.8 | 11.9 | — | 12.2 | 4.2 | 15 |
| | | Dimentional change rate (%) | 0.38 | 0.54 | 0.42 | 0.5 | — | — | 35 | — |

TABLE 3-continued

| | Comparative Example | | | | | | | |
|---|---|---|---|---|---|---|---|---|
| | 1 | 2 | 3 | 4 | 5 | 6 | 7 | 8 |
| Warpage of decorative board (mm) | 54 | 34 | 33 | 79 | — | — | — | — |
| Bendability | 100R | 100R | — | — | — | 100R | 45R | 45R |
| Weight increase rate (%) | — | — | — | — | — | 10.5 | — | 6.7 |

EXAMPLE 2

A non-combustible decorative board was manufactured basically in the same manner as in above-described Example 1. However, in manufacturing of a slurry, a mixing amount of acrylic resin emulsion was set to 30 parts by weight.

EXAMPLE 3

A non-combustible decorative board was manufactured basically in the same manner as in above-described Example 1. However, in manufacturing of a slurry, 2.4 parts by weight of 3-glycidoxypropyltrimethoxysilane (the (c) silane coupling agent) was added as a kind of epoxy group-containing silane.

EXAMPLE 4

A non-combustible decorative board was manufactured basically in the same manner as in above-described Example 3. However, in manufacturing of a slurry, the mixing amount of acrylic resin emulsion was set to 26 parts by weight, and the mixing amount of 3-glycidoxypropyltrimethoxysilane (the (c) silane coupling agent) was set to 2.2 parts by weight.

EXAMPLE 5

A non-combustible decorative board was manufactured basically in the same manner as in aforementioned Example 3. However, in manufacturing of a slurry, the mixing amount of acrylic resin emulsion was set to 32 parts by weight, and the mixing amount of 3-glycidoxypropyltrimethoxysilane (the (c) silane coupling agent) was set to 2.2 parts by weight.

EXAMPLE 6

A non-combustible decorative board was manufactured basically in the same manner as in aforementioned Example 3. However, in manufacturing of a slurry, the mixing amount of acrylic resin emulsion was set to 26 parts by weight, and the mixing amount of 3-glycidoxypropyltrimethoxysilane (the (c) silane coupling agent) was set to 1.9 parts by weight.

EXAMPLE 7

A non-combustible decorative board was manufactured basically in the same manner as in aforementioned Example 3. However, in manufacturing of a slurry, the mixing amount of acrylic resin emulsion was set to 34 parts by weight, the mixing amount of aluminum hydroxide was set to 120 parts by weight, the mixing amount of heavy calcium carbonate was set to 120 parts by weight, the mixing amount of 3-glycidoxypropyltrimethoxysilane (the (c) silane coupling agent) was set to 2.2 parts by weight.

EXAMPLE 8

A non-combustible decorative board was manufactured basically in the same manner as in aforementioned Example 3. However, in manufacturing of a slurry, the mixing amount of acrylic resin emulsion was set to 34 parts by weight, the mixing amount of aluminum hydroxide was set to 240 parts by weight, and the mixing amount of 3-glycidoxypropyltrimethoxysilane the ((c) silane coupling agent) was set to 2.2 parts by weight.

EXAMPLE 9

Figure 2:
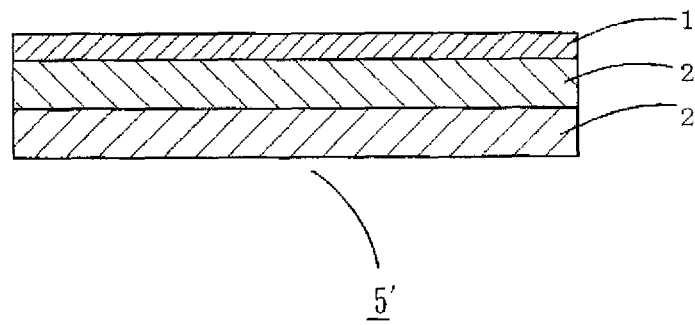
FIG. 2 is a cross sectional View showing a configuration of a non-combustible decorative board 5'.

A non-combustible decorative board was manufactured basically in the same manner as in aforementioned Example 3. However, in manufacturing of a slurry, the mixing amount of 3-glycidoxypropyltrimethoxysilane (the (c) silane coupling agent) was set to 2.2 parts by weight. Also, the non-combustible decorative board was manufactured without using the melamine resin impregnated balance paper. As shown in FIG. 2, the manufactured non-combustible decorative board 5' has a laminated structure of a sheet of the melamine resin impregnated decorative paper 1 and two sheets of the prepreg 2.

The non-combustible decorative board manufactured in the present example had a slightly smaller flexural strength and a slightly larger warpage, as compared with the non-combustible decorative boards manufactured in the aforementioned Examples 1-8 non-combustible decorative board.

EXAMPLE 10

A non-combustible decorative board was manufactured basically in the same manner as in aforementioned Example 3. However, in manufacturing of a slurry, 2.2 parts by weight of 3-(2-aminoethyl)aminopropyltrimethoxysilane (trade name: SH-6020, manufactured by Dow Corning Toray Co., Ltd.) was used in place of 3-glycidoxypropyltrimethoxysilane. 3-(2-aminoethyl)aminopropyltrimethoxysilane is an example of the (c) silane coupling agent.

EXAMPLE 11

A non-combustible decorative board was manufactured basically in the same manner as in aforementioned Example 3. However, in manufacturing of a slurry, a same amount of an acrylic urethane emulsion (trade name: WENT-3008, manufactured by Taisei Fine Chemical Co., Ltd.) was used in place of acrylic resin emulsion (Product No. AXN-150, manufactured by AICA Kogyo Co., Ltd., average particle diameter: 225 nm), and the mixing amount of 3-glycidoxypropyltrimethoxysilane was set to 2.2 parts by weight.

EXAMPLE 12

A non-combustible decorative board was manufactured basically in the same manner as in aforementioned Example 11. However, in manufacturing of a slurry, a same amount of a non-ionic aqueous polyurethane resin (HYDRAN (registered trademark) WLI-602, manufactured by DIC Corporation) constituted by high-molecular-weight thermoplastic urethane resin dispersed stably into water was used in place of acrylic urethane emulsion (trade name: WEM-3008, manufactured by Taisei Fine Chemical Co., Ltd.).

EXAMPLE 13

A non-combustible decorative board was manufactured basically in the same manner as in aforementioned Example 11. However, in manufacturing of a slurry, a same amount of an aqueous solution of vinyl chloride composed mainly of vinyl chloride polymer (VINYBLAN (registered trademark) 711, glass-transition temperature: 30° C., manufactured by Nisshin Chemical Industry Co., LTd.) was used in place of acrylic urethane emulsion (trade name: WEM-3008, manufactured by Taisei Fine Chemical Co., Ltd.).

EXAMPLE 14

A non-combustible decorative board was manufactured basically in the same manner as in aforementioned Example 4. However, in manufacturing of a slurry, the mixing amount of the acrylic resin emulsion was set to 24 parts by weight and 12 parts by weight of melamine-formaldehyde resin was additionally mixed.

COMPARATIVE EXAMPLE 1

(Manufacturing of Slurry)
A slurry containing the below-mentioned components was manufactured:
  phenol-formaldehyde resin: 36 parts by weight (solid content)
    aluminum hydroxide having an average particle diameter of 8 μm: 200 parts by weight
    heavy calcium carbonate having an average particle diameter of 1 μm: 40 parts by weight 3-glycidoxypropyltrimethoxysilane: 2.2 parts by weight
(2) Manufacturing of Prepreg
  A non-woven glass fiber fabric (the fibrous substrate) of 50 g/m² was impregnated with the slurry manufactured in above (1) so as to have an impregnation rate of 760% according to the calculation method defined by Mathematical Formula 1, and was then dried to obtain a prepreg.
(3) Manufacturing of Melamine Resin Impregnated Decorative Paper
  A melamine resin impregnated decorative paper was manufactured in the same manner as in the aforementioned Example 1.
(4) Manufacturing of Melamine Resin Impregnated Balance Paper
  A melamine resin impregnated balance paper was manufactured in the same manner as in the aforementioned Example 1.
(5) Manufacturing of Non-combustible Decorative Board
  A sheet of the melamine resin impregnated balance paper manufactured in the above (4), two sheets of the prepreg manufactured in the above (2), and a sheet of the melamine resin impregnated decorative paper manufactured in the above (3) were stacked In this order from the bottom, and integrated by thermocompression molding under conditions of 130° C., 70 kg/cm², and 60 minutes using a flat-finish plate to obtain a non-combustible decorative board.

COMPARATIVE EXAMPLE 2

A non-combustible decorative board was manufactured basically in the same manner as in aforementioned Comparative Example 1. However, in manufacturing of a slurry, a same amount of melamine-formaldehyde resin was used in place of the phenol-formaldehyde resin.

COMPARATIVE EXAMPLE 3

A non-combustible decorative board was manufactured basically in the same manner as in aforementioned Comparative Example 1. However, in manufacturing of a slurry, 18 parts by weight (solid content) of acrylic resin emulsion (Product N. AXN-150, manufactured by AICA Kogyo Co., Ltd., average particle diameter: 225 nm) having a glass-transition temperature (Tg) of 47° C. as a thermoplastic resin and 18 parts by weight (solid content) of melamine-formaldehyde resin were used in place of the phenol-formaldehyde resin.

COMPARATIVE EXAMPLE 4

A non-combustible decorative board was manufactured basically in the same manner as in aforementioned Comparative Example 1. However, in manufacturing of a slurry, 12 parts by weight (solid content) of acrylic resin emulsion (Product N. AXN-150, manufactured by AICA Kogyo Co., Ltd., average particle diameter: 225 nm) having a glass-transition temperature (Tg) of 47° C. as a thermoplastic resin and 24 parts by weight (solid content) of melamine-formaldehyde resin were used in place of the phenol-formaldehyde resin.

COMPARATIVE EXAMPLE 5

A non-combustible decorative board was attempted to be manufactured basically in the same manner as in aforementioned Comparative Example 1. However, in manufacturing of a slurry, 18 parts by weight (solid content) of acrylic resin emulsion (Product No. AXN-150, manufactured by AICA Kogyo Co., Ltd., average particle diameter: 225 nm) having a glass-transition temperature (Tg) of 47° C. as a thermoplastic resin and 18 parts by weight (solid content) of phenol-formaldehyde resin were used in place of the phenol-formaldehyde resin.
  In the present comparative example, a non-combustible decorative board was unable to be manufactured due to a poor compatibility between acrylic resin emulsion and phenol-formaldehyde resin.

COMPARATIVE EXAMPLE 6

A non-combustible decorative board was manufactured basically in the same manner as in aforementioned Example 1. However, in manufacturing of a slurry, 11.5 parts by weight (solid content) of phenol-formaldehyde resin and 9.5 parts by weight (solid content) of melamine-formaldehyde resin were used in place of the acrylic resin emulsion.

COMPARATIVE EXAMPLE 7

A non-combustible decorative board was manufactured basically in the same manner as in aforementioned Example 1. However, in manufacturing of a slurry, 36 parts by weight (solid content) of acrylic resin emulsion (Product No. CMX-43, manufactured by AICA Kogyo Co., Ltd.) having a glass-transition temperature of −21° C. was used in place of the acrylic resin emulsion (Product No. AXN-150, manufactured by AICA Kogyo Co., Ltd., average particle diameter: 225 nm) having a glass-transition temperature (Tg) 47° C.

COMPARATIVE EXAMPLE 8

Five sheets of phenol-formaldehyde resin impregnated core paper and a sheet of melamine-formaldehyde resin impregnated pattern paper were stacked and underwent thermocompression molding under conditions of 130° C., 70 kg/cm$^2$, and 60 minutes to obtain a melamine decorative board having a thickness of 1.2 mm (a publicly-known melamine decorative board).

<Evaluation of Decorative Boards>

An evaluation test was conducted in terms of non-combustibility, flexural strength, elastic modulus, dimensional change rate, warpage of decorative board, bending workability, and weight increase rate with respect to each decorative board in each of the examples and comparative examples. Methods of the test were as described hereinafter.

(i) Non-combustibility

A heat release rate test for 20 minutes using a cone calorimeter in accordance with ISO5660 was conducted. An evaluation of "o (good)" was given in a case where all of α-γ below were satisfied; an evaluation of "x (poor)" was given in the remaining cases.

α: A gross calorific value is 8 MJ/m$^2$ or less.
β: A maximum heat release speed does not continuously exceed 200 KW/m$^2$ for 10 seconds or longer.
γ: No crack or hole penetrating to a rear surface occurs for 20 minutes after starting the test.

(ii) Flexural Strength

Measurements were made in accordance with JIS K7171 "Plastic-Determination of flexural properties".

(iii) Elastic Modulus

Measurements were made in accordance with JIS K7171 "Plastic-Determination of flexural properties".

(iv) Dimensional Change Rate

Measurements were made by means of the dimensional stability test in accordance with JIS K6902 "Testing method for laminated thermosetting high-pressure decorative sheets".

(v) Warpage of Decorative Board

Samples of 50 mm×300 mm each having a fiber direction oriented in a lateral direction were cured in an environment at a room temperature of 40° C. and a humidity of 30% for 24 hours. Subsequently, measurements were made in terms of warpage height from a horizontal plane when the samples were placed on the horizontal plane.

(vi) Bending Workability

Samples were cut to have a width of 150 mm, and bent after applying the samples to a bending rod having a predetermined radius such that the fiber direction of each decorative board was parallel to the bending rod, and then presence/absence of occurrence of a crack was visually confirmed. A minimum curvature radius that did not cause a crack was used as a measured value.

(vii) Weight Increase Rate

Measurements were made in terms of boiling resistance in accordance with JIS K6902 "Testing method for laminated thermosetting high-pressure decorative sheet". The standard value is 17% or less.

Table 1 to Table 3 above show results of the evaluation test. As clear from the results, each of the decorative boards of Examples 1-14 has non-combustibility even with a small board thickness, and also is excellent in each of the items of flexural strength, elastic modulus, dimensional change rate, warpage of decorative board, bending workability, and weight increase rate, facilitating easy processing and handling.

In contrast, each of the decorative boards of Comparative Examples 1-8 was poor in at least one of the evaluation items. Particularly, the decorative boards of Comparative Examples 1-4 were poor in evaluation results in terms of warpage of decorative board. Also, the decorative board of Comparative Example 6 was poor in bending workability. Further, the decorative board of Comparative Example 7 had a small elastic modulus and thus was difficult to handle.

The invention claimed is:

1. A decorative board comprising:
   a prepreg comprising:
      an inorganic fiber substrate;
      at least one thermoplastic resin selected from a group consisting of acrylic resin emulsion having a glass transition temperature Tg exceeding 0° C. and having an average particle diameter of 150-300 nm, and acrylic urethane;
      a thermosetting resin, a mixing ratio of the thermoplastic resin to the thermosetting resin being 1:0-0.5 in solid content ratio by weight; and
      an endothermic metal hydroxide; and
   a thermosetting resin impregnated decorative paper comprising:
      a thermosetting resin; and
      a decorative paper;
   wherein the prepreg and the thermosetting resin impregnated decorative paper are stacked and integrated.

2. The decorative board as set forth in claim 1, wherein the prepreg further comprises a silane coupling agent.

3. The decorative board as set forth in claim 1, wherein the endothermic metal hydroxide is aluminum hydroxide.

4. The decorative board as set forth in claim 1, wherein the inorganic fiber substrate is a non-woven glass fiber fabric.

5. The decorative board as set forth in claim 2, wherein the silane coupling agent is an epoxy group-containing silane or an amino group-containing silane.

6. The decorative board as set forth in claim 2, wherein the silane coupling agent is 3-glycidoxypropyltrimethoxysilane.

7. The decorative board as set forth in claim 2, wherein a mixing ratio of the silane coupling agent is 0.7-0.9 weight % of an entire mixture of the binder component, the endothermic metal hydroxide, and the silane coupling agent.

8. The decorative board as set forth in claim 1, wherein the acrylic resin emulsion is formed by polymerizing ethyl acrylate and methyl methacrylate as main monomers.

9. The decorative board as set forth in claim 1, wherein the prepreg further comprises calcium carbonate.

10. The decorative board as set forth in claim 9, wherein an average particle diameter of the calcium carbonate is 0.05-10 μm.

11. The decorative board as set forth in claim 1, wherein the thermosetting resin impregnated decorative paper is a melamine resin impregnated decorative paper.

12. The decorative board as set forth in claim 1, wherein a resin impregnated balance paper obtained by impregnating a third resin into a surface paper is further stacked on and integrated with the prepreg and the thermosetting resin impregnated decorative paper.

13. The decorative board as set forth in claim 12, wherein the resin impregnated balance paper is a melamine resin impregnated balance paper.

14. The decorative board as set forth in claim 12, wherein the resin impregnated balance paper is obtained by impregnating the surface paper weighing between 18-40 g/m² with a thermosetting third resin with an impregnation rate of 260% to 320%.

15. The decorative board as set forth in claim 1, wherein the prepreg further includes a non-aqueous inorganic filler having an average particle diameter of 0.05-20 μm.

16. A decorative board comprising:
  a melamine resin impregnated decorative paper obtained by impregnating a decorative paper weighing between 30-140 g/m² with a melamine resin with an impregnation rate of 80% to 300%;
  a prepreg disposed next to the melamine resin impregnated decorative paper, the prepeg including:
    an acrylic resin emulsion having a glass transition temperature Tg exceeding 0° C. and having an average particle diameter of 150-300 nm;
    an endothermic metal hydroxide having an average particle diameter of 1-50 μm;
    a fiber substrate; and
    a silane coupling agent; and
  a resin impregnated balance paper disposed adjacent the prepeg, the resin impregnated balance paper obtained by impregnating a surface paper weighing between 18-40 g/m² with a melamine resin with an impregnation rate of 260% to 320%.

17. The decorative board as set forth in claim 16, wherein the prepreg further includes a non-aqueous inorganic filler having an average particle diameter of 0.05-20 μm.

18. The decorative board as set forth in claim 16, wherein the prepreg further includes a thermosetting resin, a mixing ratio of the acrylic resin emulsion to the thermosetting resin being 1:0.5 in solid content ratio by weight.

19. A decorative board comprising, from a top to a bottom:
  a melamine resin impregnated decorative paper;
  a first prepreg layer including:
    a first thermoplastic resin formed from a first acrylic resin emulsion having a glass transition temperature Tg exceeding 0° C. and having an average particle diameter of 150-300 nm,
    a first endothermic metal hydroxide,
    a first fiber substrate,
    a first non-aqueous inorganic filler with an average particle diameter of 1-5 μm, and
    a first silane coupling agent with an impregnation rate of 700% to 1200%;
  a second prepreg layer including:
    a second thermoplastic resin,
    a second endothermic metal hydroxide,
    a second fiber substrate,
    a second non-aqueous inorganic filler, and
    a second silane coupling agent; and
  a melanine resin impregnated non-decorative paper weighing between 18 g/m2 and 40 g/m2 with an impregnation rate of 260% to 320%.

* * * * *